United States Patent [19]

Reed, Jr.

[11] 4,087,373

[45] May 2, 1978

[54] NOVEL METHOD FOR THE PRODUCTION OF HYDROGEN AND HYDROGEN-CARBON MONOXIDE MIXTURES

[75] Inventor: Russell Reed, Jr., Ridgecrest, Calif.

[73] Assignee: The United States of America as represented by the Secretary of the Navy, Washington, D.C.

[21] Appl. No.: 708,236

[22] Filed: Jul. 23, 1976

[51] Int. Cl.$^2$ ............................................... C10K 3/00
[52] U.S. Cl. ............................. 252/188.3 R; 252/182; 252/373; 423/648 R
[58] Field of Search ..................... 252/188.3, 182, 373

[56] References Cited

U.S. PATENT DOCUMENTS 497,700   5/1893   Blackmore ........................... 423/648

OTHER PUBLICATIONS

Fischer, F. et al., "Formation and Decomposition of Calcium Formate" Chemical Abstracts, vol. 18, No. 20, Nov. 3, 1924, p. 3170, Abs. No. 3170$^2$.
Bailas, J. C., Ed. *Comprehensive Inorganic Chemistry*, vol. I, Pergammon Press, Oxford, England, 1973, p. 638.

Primary Examiner—Benjamin R. Padgett
Assistant Examiner—Deborah L. Kyle
Attorney, Agent, or Firm—R. S. Sciascia; Roy Miller; L. E. K. Pohl

[57] ABSTRACT

Calcium formate is heated to a temperature in the range of from 300° to 400° C to form calcium carbonate, hydrogen and carbon monoxide and the gases are bled off. The calcium carbonate is then heated to about 825° C whereby calcium oxide and carbon dioxide are formed and the gas is again bled off. The calcium oxide is then reacted with water to form calcium hydroxide and the calcium hydroxide is reacted with carbon monoxide to regenerate calcium formate and start the process over again. The process provides a convenient method for obtaining a mixture of hydrogen and carbon monoxide gases which are useful for many purposes. The carbon monoxide may be removed from the mixture of gases produced to obtain hydrogen which also finds many uses. Further, a mixture of hydrogen and carbon monoxide suitable for use in the Fischer-Tropsch reaction may be readily produced.

1 Claim, No Drawings

NOVEL METHOD FOR THE PRODUCTION OF HYDROGEN AND HYDROGEN-CARBON MONOXIDE MIXTURES

BACKGROUND OF THE INVENTION

1. Field of the Invention

This invention relates to a method for generating a mixture of hydrogen and carbon monoxide gases and then regenerating the starting material. More particularly, this invention relates to a process for generating a mixture of hydrogen and carbon monoxide gases from calcium formate and then regenerating the calcium formate.

2. Description of the Prior Art

It is well known that practically every petrochemical or oil product known to man can be produced by the reaction of carbon monoxide and hydrogen in the Fischer-Tropsch reaction. This is a particularly valuable bit of knowledge in view of the present day oil shortages. However, the greatest potential of the Fischer-Tropsch reaction has not been realized because of the costly equipment required to generate the hydrogen and carbon monoxide used in it. Also the starting material, i.e., the material from which the carbon monoxide-hydrogen mixture is made, has been either coal or natural gas and the cost of these materials has rivaled that of natural petroleum products. It would, therefore, be advantageous is an inexpensive process operating at low pressures and temperatures were available for the production of carbon monoxide-hydrogen mixtures.

In addition to an expense drawback, the use of coal in the generation of carbon monoxide-hydrogen mixtures has the drawback of requiring very high temperatures. Coal or the like (carbon) will react with water according to the equation:

$$C + H_2O \rightarrow CO + H_2$$

but the reaction does not lend itself to industrial control. Natural gas, as a source of hydrogen-carbon monoxide mixtures, has the drawback of becoming increasingly scarce in the same manner that natural petroleum products are becoming increasingly rare.

SUMMARY OF THE INVENTION

According to this invention, a mixture of carbon monoxide and hydrogen gases is prepared by heating a readily available starting material, calcium formate. A temperature in the range of from 300° to 400° C is used. Evolution of the carbon monoxide and hydrogen gases, which are bled off, leaves calcium carbonate as a solid product. After the carbon monoxide-hydrogen mixture has been removed, the calcium carbonate may be heated to about 825° C whereby carbon dioxide is evolved and bled off and solid calcium oxide is produced. Next, the calcium oxide is reacted with water to form calcium hydroxide. The calcium hydroxide is then reacted with carbon monoxide to regenerate the starting compound, calcium formate. If the carbon monoxide-hydrogen mixture obtained when calcium formate is heated is used as the source of carbon monoxide in the calcium hydroxide-carbon monoxide reaction, the hydrogen that remains can be used to enrich a carbon monoxide-hydrogen mixture obtained by heating the regenerated calcium formate. This hydrogen enriched product is suitable for use in the Fischer-Tropsch reaction.

DESCRIPTION OF THE PREFERRED EMBODIMENT

The reaction used in the process for preparing a mixture of carbon monoxide and hydrogen according to this invention is:

$$Ca(OOCH)_2 \xrightarrow{300°-400° C} CaCO_3 + H_2 \uparrow + CO \uparrow .$$

The mixture of hydrogen and carbon monoxide obtained may be used in the Fisher-Tropsch reaction without any need for purification. It is, however, necessary to enrich with hydrogen because the Fisher-Tropsch reaction requires an excess of hydrogen. One way in which this may be accomplished will become apparent from the following discussion.

The foregoing reaction may be conveniently carried out by placing a bed of calcium formate in any container constructed in a manner whereby heating to the required temperature is permissible and possible and the bleeding off and recovery of the gaseous products, hydrogen and carbon monoxide, is possible. No catalyst is necessary.

The next reaction in the process of this invention is:

$$CaCO_3 \xrightarrow{825° C} CaO + CO_2 \uparrow .$$

This reaction, like the foregoing one, may be carried out in the absense of catalysts. As in the foregoing reaction, the gaseous product is bled off in this reaction. The carbon dioxide may be collected and used for any purpose for which carbon dioxide is normally used.

The next reaction of the process of this invention is:

$$CaO + H_2O \rightarrow Ca(OH)_2 .$$

This reaction goes very quickly and smoothly. All that has to be done is the addition of water to solid calcium oxide. That is, no catalyst is required.

Finally, carbon monoxide is added to the calcium hydroxide to regenerate the starting material, calcium formate, according to the equation:

$$Ca(OH)_2 + 2CO \rightarrow Ca(OOCH)_2 .$$

The carbon monoxide may be obtained from any readily available source. For example, the carbon monoxide-hydrogen mixture obtained from the first step of the process may be used to supply the carbon monoxide. When this mixture is used, the following occurs:

$$Ca(OH)_2 + 2CO + \boxed{2 H_2} \rightarrow Ca(OOCH)_2 + \boxed{2 H_2}$$

IF this is done, it can be seen that one obtains a solid product, calcium formate, and that hydrogen present in the reaction mixture does not react but remains a gas. The solid and gas are readily separable. Once this has occurred, it is only necessary to carry out the first step of the process again:

$$Ca(OOCH)_2 \xrightarrow{300°-400° C} CaCO_3 + CO + H_2$$

and add the hydrogen obtained the first time through to produce a hydrogen enriched gas suitable for use in the Fisher-Tropsch reaction.

On the other hand, if an equimolar mixture of carbon monoxide and hydrogen is desired for some purpose one may stop the process after the first step. Or, if hydrogen alone is desired, one has the hydrogen separated from the carbon monoxide after the step in which calcium formate is regenerated with the aid of the first carbon monoxide-hydrogen mixture.

All of the above-mentioned reactions go very readily- at the temperatures set forth when temperatures are set forth and at ambient temperature when no temperature is set forth. The Ca(OH)$_2$ + CO reaction is preferably carried out under about 2 to 3 atmospheres of pressure. No expensive or complicated apparatus is necessary.

It will become apparent to those skilled in the art that other alkaline earth formates, such as magnesium formate, strontium formate and barium formate, could be used in lieu of calcium formate as a starting material. The temperatures used in the various steps of the process would naturally vary somewhat but the process could still be readily carried out.

What is claimed is:

1. A method for producing a hydrogen enriched hydrogen-carbon monoxide mixture which is suitable for use in the Fisher-Tropsch reaction comprising the steps of:

A. heating an alkaline earth formate to 300° to 400° C to produce solid alkaline earth carbonate and an equimolar mixture of gaseous carbon monoxide and hydrogen;

B. separating the equimolar mixture of gaseous carbon monoxide and hydrogen from the solid alkaline earth carbonate;

C. heating the alkaline earth carbonate to form solid alkaline earth oxide and gaseous carbon dioxide;

D. separating the solid alkaline earth oxide from the gaseous carbon dioxide;

E. reacting the alkaline earth oxide with water to form alkaline earth hydroxide;

F. reacting the alkaline earth hydroxide with the carbon monoxide from the equimolar mixture of carbon monoxide and hydrogen obtained in step A and separated in step B to form solid alkaline earth formate whereby the hydrogen from steps A and B is left in a free gaseous state;

G. separating the hydrogen from the alkaline earth formate in step F;

H. heating the alkaline earth formate formed in step F to produce solid alkaline earth carbonate and a second equimolar mixture of carbon monoxide and hydrogen; and I. adding the equimolar mixture of carbon monoxide and hydrogen formed in step H to the hydrogen separated in step G.

* * * * *